United States Patent [19]

Sacchetti et al.

[11] Patent Number: 5,726,261
[45] Date of Patent: Mar. 10, 1998

[54] COMPONENTS AND CATALYSTS FOR THE POLYMERIZATION OF OLEFINS

[75] Inventors: Mario Sacchetti, Ferrara; Gianni Pennini, Porotto; Illaro Cuffiani, Ferrara, all of Italy

[73] Assignee: Montell Technology Company bv., Hoofddorp, Netherlands

[21] Appl. No.: 712,425

[22] Filed: Sep. 11, 1996

Related U.S. Application Data

[62] Division of Ser. No. 500,032, Jul. 10, 1995, Pat. No. 5,585,317, which is a continuation of Ser. No. 11,179, Jan. 29, 1993, abandoned.

[30] Foreign Application Priority Data

Jan. 31, 1992  [IT]  Italy .................. MI92A0194

[51] Int. Cl.$^6$ .................. C08F 4/654; C08F 10/02
[52] U.S. Cl. .................. 526/124.2; 526/124.8; 526/125.4; 526/125.5; 526/348.6; 526/352
[58] Field of Search .................. 526/124.2, 124.9, 526/124.8

[56] References Cited

U.S. PATENT DOCUMENTS

| | | | |
|---|---|---|---|
| 4,399,054 | 8/1983 | Ferraris et al. | 526/124.9 |
| 4,421,674 | 12/1983 | Invernizzi et al. | 526/124.9 |
| 4,517,307 | 5/1985 | Cuffiani et al. | 526/124.9 |
| 4,721,763 | 1/1988 | Bailly et al. | 526/124.9 |
| 5,221,651 | 6/1993 | Sacchetti et al. | 526/124.9 |

FOREIGN PATENT DOCUMENTS

| | | | |
|---|---|---|---|
| 411627 | 2/1991 | European Pat. Off. | 526/124.9 |

*Primary Examiner*—Edward J. Smith
*Attorney, Agent, or Firm*—Bryan Cave LLP

[57] ABSTRACT

The present invention relates to spherical solid components of catalysts for the polymerization of olefins comprising, supported on a magnesium dihalide in active form, a titanium compound containing at least one Ti-halogen bond and one OR group, said OR group being bonded to Ti in an amount such that the OR/Ti molar ratio is greater than or equal to 0.5; optionally the component also comprises an electron donor compound. The spherical solid components of the invention are characterized by having a porosity comprised between 0.35 and 0.7 cm$^3$/g and by a pore size distribution such that at least 50% of the porosity is due to pores having an average radius greater than 800 Å.

3 Claims, No Drawings

COMPONENTS AND CATALYSTS FOR THE POLYMERIZATION OF OLEFINS

This is a divisional of U.S. application Ser. No. 08/500,032, filed Jul. 10, 1995, now U.S. Pat. No. 5,585,317 which is a continuation of U.S. application Ser. No. 08/011,179, filed Jan. 29, 1993, now abandoned.

FIELD OF THE INVENTION

The present invention relates to components of catalysts for the polymerization of olefins, the catalysts obtained therefrom and the use thereof in the polymerization of ethylene and mixtures thereof with α-olefins $CH_2=CHR$, where R is a hydrocarbon radical having from 1 to 12 carbon atoms.

BACKGROUND INFORMATION

The need for having available in the industrial practice catalysts supported on magnesium dihalides in active form, endowed with a high activity and capable of providing polymers with a controlled morphology is more and more felt.

Examples of catalysts having a controlled morphology are described in U.S. Pat. Nos. 3,953,414 and 4,399,054. In the latter patent, the components are prepared from spherically shaped adducts of $MgCl_2$ with approximately 3 mols of alcohol. Prior to the reaction with $TiCl_4$, the alcohol content is decreased down to 2.5–2 mols: in this manner, components are obtained which exhibit a porosity, as measured with nitrogen, of from 0.3 to 0.4 g/cm$^3$ and an average pore radius comprised between 15 and 20 Å.

Catalysts prepared from $TiCl_4$ and $MgCl_2$ in granular form, by spray drying an alcohol solution of magnesium chloride and subsequently supporting the titanium compound, are described in patents EP-B-65700 and EP-B-243327. However, the polymer obtained using these catalysts does not exhibit morphological characteristics of interest. In particular, the bulk density is not sufficiently high. Furthermore, the activity of the catalyst is rather low.

A method for increasing the activity of these catalysts is described in patent EP-A-281524. These catalysts are prepared by supporting titanium alkoxides onto an $MgCl_2$-ethanol adduct, containing from 18 to 25% by weight of ethanol, spherulized by spray-drying of an ethanol solution thereof and subsequent chemical treatment with $Et_2AlCl$ or $Et_3Al_2Cl_3$. The conditions for preparing the support are critical and have an influence on the morphological stability of the resulting polymer. For example, polymers in the form of heterogeneous powder are obtained when supports are used having an alcohol content which is not comprised within the range of 18–25%, or compounds are used which are different from $Et_2AlCl$ or $Et_3Al_2Cl_3$. Furthermore, in order to achieve high yields the Ti content in the solid component is always greater than 8% by weight.

From patent application EP-A-395083, catalysts suitable for producing spherically shaped polymers endowed with satisfactory morphological properties are known, obtained from $MgCl_2$:-alcohol adducts, in which the adduct, generally containing 3 mols of alcohol per mol of $MgCl_2$, is dealcoholated by thermal treatment down to alcohol levels generally comprised between 0.2 and 2 mols, and is thereafter caused to react with an excess of titanium tetrachloride optionally containing an electron donor compound dissolved therein.

The solid components of these catalysts are characterized by a high specific surface area and microporosity (more than 50% of the pores has an average radius smaller than 800 Å). When used for the polymerization of ethylene to produce LLDPE, these catalysts lead to a comonomer distribution which is not sufficiently uniform.

SUMMARY OF THE INVENTION

It has now been unexpectedly found that catalysts having a spherical shape can be obtained, which are capable of leading to a uniform comonomer distribution in the preparation of LLDPE, and in general in the preparation of copolymers endowed with interesting morphological properties, in particular polymers having a high bulk density when obtained by polymerization in the gas phase, notwithstanding the significant macroporosity of the solid components forming the catalyst.

The spherical components of the invention comprise, supported on a magnesium dihalide in active form, a titanium compound containing at least one Ti-halogen bond and one OR group, wherein R is an alkyl or cycloalkyl or aryl radical of 1–18 carbon atoms, or a —COR group, said OR group being bonded to the titanium atom in such an amount as to yield molar ratios OR/Ti which are greater than or equal to 0.5; optionally, an electron donor compound can also be present.

Said components are characterized by having a porosity comprised between 0.35 and 0.7 cm$^3$/g, and by a pore size distribution such that at least 50% of the porosity is due to pores having an average radius greater than 800 Å. Their specific surface area is generally comprised between 5 and 30 m$^2$/g.

The porosity values indicated above refer to measurements carried out on pores having a radius of up to 10,000 Å.

The spherical components of the invention are furthermore characterized in that at least 30% of the total porosity is due to pores having a radius greater than 10,000 Å. As defined herein the total porosity refers to measurements carried out on pores having a radius comprised between 0 to 300,000 Å.

The porosity and specific surface area are determined by mercury porosimetry, according to the method hereinafter described.

DETAILED DESCRIPTION

The magnesium dihalides in active form comprised in the spherical component of the invention are characterized by X-ray spectra wherein the most intense diffraction line appearing in the spectrum of the non-active halide shows a decreased intensity, and in said spectrum a halo appears, the maximum intensity of which is shifted towards lower angles with respect to the angles of the most intense line.

The particles have a spherical or spheroidal shape with an average diameter comprised between 10 and 150 μm. By particles having a spheroidal shape those particles are meant in which the ratio of the major axis to the minor axis is equal to or smaller than 1.5 and preferably smaller than 1.3.

Preferred titanium compounds have the formula $Ti(OR^1)_nX_{y-n}$, wherein n is a number greater than or equal to 0.5 and is one unit less than the titanium valency y, and is preferably comprised between 1 and 2 when y is 4; X is halogen and $R^1$ is an alkyl radical of 2–8 carbon atoms, in particular n-butyl, isobutyl, 2-ethylhexyl, n-octyl and phenyl.

The titanium compound to be supported onto the magnesium dihalide can be pre-formed, or it is produced in-situ by the reaction of a titanium tetrahalide, in particular $TiCl_4$, with the OH groups of the residual alcohol present in a combined form in said magnesium dihalide, or by the reaction of said tetrahalide with alcohols ROH or with titanium alkoxides having the formula $Ti(OR)_4$.

The titanium tetralkoxides can furthermore be caused to react with halogenating compounds such as, for instance, $SiCl_4$, $AlCl_3$, chlorosilanes, Al-alkyl halides. In the latter case, the titanium valency is reduced and titanium haloalkoxides are formed wherein the titanium valency is lower than 4.

Titanium haloalkoxides with a valency lower than 4 can also be formed by means of the reaction of titanium tetralkoxides with mixtures of halogenating and reducing compounds.

The titanium alkoxides to be used in the preparation of the catalyst component can be in the form of complexes with magnesium halides. Examples of the preparation of said complexes are given in U.S. Pat. No. 4,218,339, the description thereof being herein incorporated by reference.

The magnesium dihalide in active form, preferably magnesium dichloride, is obtained from adducts $MgX_2 \cdot nROH$, wherein R is an alkyl or cycloalkyl or aryl radical of 1–12 carbon atoms and n is generally larger than 2 and in particular comprised between 2.5 and 3.5.

These adducts are prepared in spherical form from melted adducts, by emulsifying the adducts in a liquid hydrocarbon and thereafter causing then, to solidify by fast quenching. A typical method for preparing these spherulized adducts is reported in U.S. Pat. No. 4,469,648, the description of which is herein incorporated by reference. The thus obtained spherulized adducts are subjected to thermal dealcoholation at temperature comprised between 50° and 150° C. until the alcohol content is reduced to values lower than 2 and preferably comprised between 1.5 and 0.3 mols per mol of magnesium dihalide, and are finally treated with chemical reagents capable of reacting with the OH groups of the alcohol and of further dealcoholating the adduct until the content is reduced to values which are generally lower than 0.5 mols.

When the thermally dealcoholated adduct shows an alcohol content of around 2 mols, the content of residual alcohol may be up to 0.5 mols; preferably it is about 0.2–0.3 mols. Lower values are reached when the starting adduce contains a lower amount of alcohol.

The adduces can also be dealcoholated to a very great extent, by reducing the alcohol content down to values lower than 0.05 mols.

The treatment with the dealcoholating chemical agents is carried out by using an amount of such an agent which is large enough to react with the OH groups present in the alcohol contained in the adduct. Preferably, the treatment is carried out using a slight excess of said agent, which is then removed prior to the reaction of the titanium compound with the thus obtained support.

In the event that the chemical dealcoholation of the $MgCl_2 \cdot pROH$ adduce is carried out by using agents having a reducing activity, for instance an Al-alkyl compound such as Al-triethyl, the thus obtained compound, prior to the reaction with the titanium compound, can be treated with a deactivating agent, for instance $O_2$ or an alcohol, in order to deactivate the Al-triethyl possibly present therefore avoiding the reduction of the titanium compound.

The treatment with deactivating agents is avoided when one wishes to at least partially reduce the titanium compound. If on the other hand one wishes to reduce the titanium compound to a very great extent, the process for preparing the catalyst component can advantageously comprise the use of reducing agents.

The reaction with the titanium compound is carried out by using, as indicated above, the pre-formed haloalkoxide or halocarboxylate, or by forming said compound in-situ by reacting a Ti tetrahalide, in particular, $TiCl_4$, with the OH groups present in the adduct or with an alcohol ROH, or by causing a titanium tetrakoxide to react with a halogenating agent such as $SiCl_4$, halosilanes, $TiCl_4$ itself, $AlCl_3$, Al-alkyl halides.

In some instances it is convenient that the titanium compound be reduced to a valency lower than 4. Said result is obtained, for example, by using a halogenating agent which simultaneously acts as a reducing agent, such as, for instance, an Al-alkyl halide, or by using reducing agents such as silicon compounds, for instance polyhydrosiloxanes.

The amount of titanium compound used in the reaction corresponds to the amount which remains fixed on the support, or a slight excess is used; said excess is then removed.

In general, titanium is used in such an amount that the molar ratio Ti/Mg varies within the range of 0.05 to 3, and preferably within the range of 0.1 to 2.

The titanium amount which remains fixed on the support may reach, for instance, up to 15% by weight, expressed as the Ti metal content, and is preferably comprised between 1 and 12%.

The titanium compound supported on magnesium dihalide is fixed in a form which cannot be extracted by solvents; it may also be partially present in an extractable form.

The component of the invention may optionally comprise, in particular when one wishes to produce an LLDPE having a particularly narrow molecular weight distribution, also an electron donor compound (inside donor), e.g. a compound selected from ethers, esters, amines and ketones.

In particular, the electron donor compound can be selected from the alkyl, cycloalkyl and aryl esters of polycarboxylic acid, such as, for instance, esters of the phthalic and maleic acids, in particular n-butyl phthalate, diisobutyl phthalate di-n-octyl phthalate; other useful compounds are those disclosed in patent application EP-A-422755, the description of which is herein incorporated by reference, in particular 2-methyl- 2- isopropyl- 1,3- dimethoxypropane 2-methyl- 2- isobutyl-1,3-dimetoxypropane; 2- isopropyl-2-isopentyl- 1,3-dimethoxypropane; 2,2- diisobutyl- 1,3-dimetoxypropane.

The electron donor compound is generally present in a molar ratio to the magnesium of up to 1:2.

By reacting with Al-alkyl compounds, in particular Al-trialkyl compounds, the compounds of the invention form catalysts which, as already indicated, lead to a very uniform distribution of the comonomer along the polymer chain, and furthermore allow to obtain by polymerization in the gas phase polymers which are endowed with interesting morphological characteristics, in particular as regards the bulk density, which can be controlled up to very high values.

The evaluation of the comonomer distribution is carried out by measuring the polymer fraction which is soluble in xylene at 25° C., the content of bonded comonomer and the real polymer density.

The result obtained by polymerization in the gas phase is an all unpredictable result as regards the bulk density of the polymer, the range of which is shifted towards higher values than obtainable in the presence of a solvent.

Examples of an Al-alkyl compounds which can be used in the preparation of the catalyst are the Al-trialkyls, in particular Al-triethyl, Al-tri-n-butyl, Al-triisobutyl. The ratio Al/Ti is greater than 1 and generally comprised between 20 and 800.

The catalysts are advantageously used in the polymerization of ethylene and mixtures thereof with α-olefins $CH_2$=CHR, wherein R is an alkyl or cycloalkyl or aryl radical with 1–12 carbon atoms. In particular, they are used in the preparation of:

high density polyethylenes (HDPE, having a density greater than 0.940 g/cm$^3$), including homopolymers of ethylene and copolymers of ethylene with alpha-olefins having from 3 to 14 carbon atoms;

linear low density polyethylenes (LLDPE, having a density lower than 0.940 g/cm$^3$) and very low and ultra low density linear polyethylenes (VLDPE and ULDPE, having a density lower than 0.920 g/cm$^3$ and as low as 0.880 g/cm$^3$) consisting of copolymers of ethylene with one or more alpha-olefins having from 3 to 12 carbon atoms, having a content of units derived from ethylene greater than approximately 80% by weight;

elastomeric copolymers of ethylene and propylene and elastomeric terpolymers of ethylene and propylene with minor amounts of a diene, having a content of units derived from ethylene comprised between about 30 and 70% by weight.

The polymerization of olefins in the presence of the catalysts obtained from the catalyst components of the invention can be carried out according to the known techniques both in the liquid phase and in the gas phase, by using, for example, the known fluidized bed technique or under conditions in which the polymer is stirred by mechanical means.

An example of a process in which the spherical components of the invention can be used is the process described in the Italian patent application No. MI-91-A-002142. Said process comprises a step of pre-contacting the catalyst components, a prepolymerization step, and a gas-phase polymerization step in two or more fluidized-bed or mechanically stirred-bed reactors in series.

The following examples are supplied for merely illustrative purposes, and are not to be construed as being limitative of the invention itself.

The properties indicated are determined according to the following methods:

Porosity and specific surface area with nitrogen: determined according to the B.E.T methodology (apparatus used SORPTOMATIC 1800 by Carlo Erba).

Porosity and specific surface area with mercury: determined by immersing a known amount of sample in a known amount of mercury inside a dilatometer and then gradually increasing mercury pressure by a hydraulic means. The pressure of mercury entering the pores is a function of the diameter of the pores. The measurement is carried out by using a "Porosimeter 2000 Series" porosimeter by Carlo Erba. From the data of mercury volume decrease and of applied pressure, porosity, pore distribution and specific surface area are calculated.

Size of the catalyst particles: determined according to a method based on the principle of optical diffraction of monochromatic laser light, using the "Malvern Instr. 2600" apparatus.

MIE flow index: ASTM-D 1238

MIF flow index: ASTM-D 1238

Flowability: it is the time required by 100 g of polymer to flow through a funnel, the outlet opening thereof having a diameter of 1.25 cm, and the side walls being inclined at 20° to the vertical.

Bulk density: DIN-53194

Morphology and Granulometric distribution of the polymer particles: ASTM-D 1921-63

Fraction soluble in xylene: determined at 25° C.

Comonomer content: percentage by weight, as determined via I.R. spectra.

Real density: ASTM-D 792.

EXAMPLES

Preparation of the Spherical Support (MgCl$_2$/EtOH Adduct)

The adduct of magnesium chloride and alcohol was prepared according to the method described in Example 2 of U.S. Pat. No. 4,399,054, but operating at 2,000 rpm instead of 10,000 rpm.

The adduct containing approximately 3 mols of alcohol had an average size of approximately 60 μm, with a dispersion range of approximately 30–90 μm.

Example 1

Preparation of the Solid Component

The spherical support prepared according to the general method was subjected to thermal treatment, under nitrogen flow, within the temperature range of 50°–150° C., until spherical particles having a residual alcohol content of about 35% (1.1 mols of alcohol per mol of MgCl$_2$) were obtained.

300 g of this support, in suspension with 3,000 cm$^3$ of anhydrous hexane, were charged to a 5,000 cm$^3$ reactor. With stirring and at ambient temperature, 130 g of AlEt$_3$ in solution in hexane (107 g/l) were slowly added. The temperature was raised to 60° C. and kept constant for 60 minutes. Stirring was discontinued, settling was allowed to occur and the clear phase was removed. The treatment with AlEt$_3$ was repeated two more times under the same conditions. Then 3 washes with anhydrous hexane and drying at 50° C. were carried out.

The thus obtained support exhibited the following characteristics:

| | |
|---|---|
| Porosity (Hg) | 1.144 cm$^3$/g |
| Surface Area (hg) | 15.2 m$^2$/g |
| Residual OEt | 5.5% (by weight) |
| Residual Al | 3.6% (by weight) |
| Mg | 20.4% (by weight) |

260 g of the support were charged to a 1,000 cm$^3$ reactor together with 3,000 cm$^3$ of anhydrous hexane. Stirring was initiated and over a time period of 30 minutes 242 g of Ti(OBu)$_4$ were fed at ambient temperature. Stirring was continued for a further 30 minutes and then 350 g of SiCl$_4$ diluted with 250 cm$^3$ of hexane were fed over a 30 minute period and at ambient temperature. The temperature was raised to 65° C. in 40 minutes and kept constant for 3 hours, then the liquid phase was separated out by settling and siphoning. Seven washes with hexane (3,000 cm$^3$ each time) were carried out, 3 thereof at 60° C. and 4 at ambient temperature. The component in spherical form was vacuum dried at 50° C.

The characteristics were as follows:

| | |
|---|---|
| Total Titanium | 3.4% (by weight) |
| Mg | 17.1% (by weight) |
| Si | 0.9% (by weight) |
| Cl | 57.4% (by weight) |
| Residual Al | 1.3% (by weight) |
| OEt | 2.9% (by weight) |
| OBu | 13.2% (by weight) |
| Porosity (B.E.T.) | 0.108 cm$^3$/g, 50% thereof being due to pores with a radius of >350 Å |
| Surface Area (B.E.T.) | 28.6 m$^2$/g |
| Porosity (mercury) | 0.536 cm$^3$/g due to pores with a radius of 0-to-10,000 Å, 50% thereof being due to pores with a radius of >1,250 Å. Within the range of pores with a radius of 0-to-300,000 Å, 48% of the pores had a radius of >10,000 Å |
| Surface Area (mercury) | 12.8 m$^2$/g. |

Copolymerization of Ethylene with Butene-1 (LLDPE)

A 4 liter stainless steel autoclave, purged under nitrogen flow for 2 hours at 70° C. and then washed with anhydrous propane, was charged with 0.01 g of the solid component and 0.96 g of Al-trietyl mixed with 25 cm$^3$ of hexane, and 800 g of anhydrous propane. The temperature was raised to 75° C., and then 2 bars of H$_2$ were fed simultaneously with 7 bars of ethylene and 200 g of butene-1.

During the course of polymerization, the ethylene partial pressure was kept constant and 3 g of butene-1 were added per each 30 g of ethylene fed. After three hour, the reaction was stopped by instantaneously venting off the reactants and propane. The produced amount of polymer was 280 g.

The characteristics of the polymer were as follows:

| | | |
|---|---|---|
| MIE | | 0.99 g/10 min |
| MIF/MIE | | 25.8 |
| Real Density | | 0.922 g/cm$^3$ |
| Fraction Soluble in Xylene | | 7.5% |
| Bonded Butene | | 5.4% |
| Bulk Density, Poured | | 0.35 g/cm$^3$ |
| Flowability | | 18 s |
| Morphology | | spherical |
| P.S.D. | >4,000 μm | <0.5% (by weight) |
| | 2,000–4,000 μm | 20–30% (by weight) |
| | 1,000–2,000 μm | 40–70% (by weight) |
| | 500–1,000 μm | 1–3% (by weight) |
| | <500 μm | <1% (by weight) |

Polymerization of Ethylene (HDPE)

A 2.5 l autoclave, purged as described above, was charged with 900 cm$^3$ of hexane containing 0.45 g of AlEt$_3$ and 0.01 g of the spherical component suspended in 100 cc of the same AlEt$_3$/hexane mixture as described above. Stirring was initiated, the temperature was raised to 75° C., and then 3 bars of H$_2$ and 7 bars of ethylene were fed. The polymerization time was of 3 hours, during which time the ethylene pressure was kept constant. After 3 hours, the reaction was stopped by instantaneously venting off ethylene and hydrogen. 270 g of polymer were obtained, which exhibited the following characteristics:

| | |
|---|---|
| MIE | 0.44 g/10 min |
| MIF/MIE | 28.8 |
| Real Density | 0.961 g/cm$^3$ |
| Bulk Density | 0.32 g/cm$^3$ |
| Flowability | 18 s |
| Morphology | spherical |

-continued

| | | |
|---|---|---|
| P.S.D. | >4,000 μm | <0.5% (by weight) |
| | 2,000–4,000 μm | 20–30% (by weight) |
| | 1,000–2,000 μm | 40–70% (by weight) |
| | 500–1,000 μm | 2–4% (by weight) |
| | <500 μm | <2% (by weight) |

Example 2

The spherical support was prepared according to the general method and was subjected to thermal treatment followed by treatment with AlEt$_3$, according to the same methodologies described in Example 1. A 5 liter reactor was charged with 260 g of the thus obtained support, in suspension with 2.5 liters of anhydrous hexane. With stirring and at ambient temperature, 568 g of Ti(OBu)$_4$ were gradually fed. Stirring conditions were maintained at ambient temperature for 60 minutes and then 437 g of SiCl$_4$ diluted with 300 cm$^3$ of hexane were fed over approximately 30 minutes and at ambient temperature. The temperature was then raised to 65° C. and after 60 minutes was lowered to 40° C.; at this point, 320 g of PMHS (polymethylhydrogensilane) were fed. The temperature was raised to 60° C. and kept constant for 2 hours, with stirring. The solid catalyst component was then washed with hexane to eliminate any free SiCl$_4$, simultaneously taking care in removing a small amount of very fine powder (1–2%), of a size smaller than 5 μm, easily removed together with the wash liquids. The component was then vacuum dried at 50° C.

The characteristics were as follows:

| | |
|---|---|
| Total Titanium | 4.5% (by weight) |
| Ti$^{III}$ | 2.2% (by weight) |
| Mg | 15% (by weight) |
| Cl | 51% (by weight) |
| OEt | 1.2% (by weight) |
| OBu | 10.8% (by weight) |
| Porosity (B.E.T.) | 0.114 cm$^3$/g, 50% thereof being due to pores with a radius of >260 Å |
| Surface Area (B.E.T.) | 33 m$^2$/g |
| Porosity (mercury) | 0.48 cm$^3$/g due to pores with a radius of 0-to-10,000 Å, 50% thereof being due to pores with a radius of >1,200 Å. Within the range of pores with a radius of 0-to-300,000 Å, 55% of the pores had a radius of >10,000 Å. |

Copolymerization of Ethylene with Butene-1 (LLDPE)

The copolymerization of ethylene with butene-1 was carried out under the same conditions as for Example 1. Using 0.092 g of the solid component, 280 g of polymer were obtained.

The characteristics of the polymer were as follows:

| | | |
|---|---|---|
| MIE | | 0.6 g/10 min |
| MIF/MIE | | 28 |
| Real Density | | 0.921 g/cm$^3$ |
| Fraction Soluble in Xylene | | 7.3% |
| Bonded Butene | | 5.8% |
| Bulk Density, Poured | | 0.32 g/cm$^3$ |
| Flowability | | 18 s |
| Morphology | | spherical |
| P.S.D. | >4,000 μm | <1% (by weight) |
| | 2,000–4,000 μm | 30–40% (by weight) |
| | 1,000–2,000 μm | 40–60% (by weight) |
| | 500–1,000 μm | 1–3% (by weight) |
| | <500 μm | <1% (by weight) |

Polymerization of Ethylene (HDPE)

The copolymerization of ethylene was carried out under the same conditions as for Example 1. At the end, 300 g of polymer were obtained, which exhibited the following characteristics:

| MIE | | 0.084 g/10 min |
|---|---|---|
| MIF/MIE | | 27.9 |
| Bulk Density, Poured | | 0.33 g/cm³ |
| Flowability | | 15 s |
| Morphology | | spherical |
| P.S.D. | >4,000 μm | <1% (by weight) |
| | 2,000–4,000 μm | 20–30% (by weight) |
| | 1,000–2,000 μm | 30–70% (by weight) |
| | 500–1,000 μm | 1–3% (by weight) |
| | <500 μm | <2% (by weight) |

Example 3

The spherical support was prepared according to the general method and was subjected to thermal treatment until 45% of residual alcohol was obtained (molar ratio alcohol/ethanol=1.7).

2.360 of this support, in suspension in 18 l of anhydrous hexane, were charged to a 30 liter reactor. With stirring and at ambient temperature, 1.315 g of AlEt₃ in hexane solution (concentration 100 g/liter) were fed over 60 minutes. The temperature was raised to 60° C. in 60 minutes, and kept constant for a further 60 minutes. The liquid phase was removed by settling and filtering and 15 liters of anhydrous hexanol were fed. The treatment was repeated two more times, operating under the same conditions. The spherical powder was washed 5 times with 10 liters of anhydrous hexane and vacuum dried.

The characteristics were as follows:

| Residual OEt | 8.4% (by weight) |
|---|---|
| Cl | 60.5% (by weight) |
| Mg | 13.8% (by weight) |
| Morphology | spherical |

1.500 g of the so obtained support, in suspension with 17 liters of anhydrous hexane, were charged to a 25 liter reactor. With stirring and at ambient temperature, 2,750 g of Ti(OBu)₄ were fed. Stirring was continued at ambient temperature for 60 minutes and then 2,100 g of SiCl₄ were slowly added. The temperature was raised to 60° C. and kept constant for 2 hours. A number of washes with anhydrous hexane was carried out to eliminate any free SiCl₄, with the very fine powder remaining in suspension (approximately 1% by weight with a size of <5 μm) being simultaneously removed from the solid component which was settling. The solid component was then vacuum dried at 50° C.

The characteristics were as follows:

| Total Titanium | 6.7% (by weight) |
|---|---|
| Ti^III | 4.3% (by weight) |
| Mg | 11.5% (by weight) |
| Cl | 52.3% (by weight) |
| OEt | 1.9% (by weight) |
| OBu | 13.4% (by weight) |
| Porosity (B.E.T.) | 0.083 cm³/g, 50% thereof being due to pores with a radius of >220 Å |
| Surface Area (B.E.T.) | 24.3 m²/g |
| Porosity (mercury) | 0.457 cm³/g due to pores with a radius of 0-to-10,000 Å, 50% thereof being due to pores with a radius of >1,200 Å. Within the range of pores with a radius of 0-to-300,000 Å, 60% of the pores had a radius of >10,000 Å. |

Copolymerization of Ethylene with Butene-1 (LLDPE)

0.0114 g of the so obtained spherical component were used to copolymerize ethylene with butene-1 according to the same procedure as described in Example 1.

320 g of polymer were obtained, which had the following characteristics:

| MIE | | 1.5 g/10 min |
|---|---|---|
| MIF/MIE | | 30 |
| Real Density | | 0.916 g/cm³ |
| Fraction Soluble in Xylene | | 14% |
| Bonded Butene | | 7.7% |
| Bulk Density, Poured | | 0.33 g/cm³ |
| Flowability | | 20 s |
| Morphology | | spherical |
| P.S.D. | >4,000 μm | <0.5% (by weight) |
| | 2,000–4,000 μm | 20–30% (by weight) |
| | 1,000–2,000 μm | 40–60% (by weight) |
| | 500–1,000 μm | 2–4% (by weight) |
| | <500 μm | <1% (by weight) |

Example 4

A 1,000 cm³ reactor was charged with 40 g of the support of Example 1, after having been treated with AlEt₃, in suspension with 500 cm³ of anhydrous hexane. With stirring and at ambient temperature, 40 g of Ti(OC₄H₉)Cl₃ diluted in 100 cm³ of hexane were fed. The temperature was raised to 55° C. and kept constant for 1 hour. The liquid phase was removed, then the treatment was repeated with an additional 40 g of Ti(OC₄H₉)Cl₃ diluted with 300 cm³ of hexane, at a temperature of 60° C. for 2 hours. Thereafter, three washes were carried out at 60° C. and 4 washes at ambient temperature, each time using 300 cm³ of hexane.

After vacuum drying at 40° C., the solid powder in spherical form had the following characteristics:

| Total Titanium | 5.4% (by weight) |
|---|---|
| Porosity (B.E.T.) | 0.116 cm³/g, 50% thereof being due to pores with a radius of >300 Å |
| Surface Area (B.E.T.) | 26.5 m²/g |
| Porosity (mercury) | 0.520 cm³/g due to pores with a radius of 0-to-10,000 Å, 50% thereof being due to pores with a radius of >1,320 Å. Within the range of pores with a radius of 0-to-300,000 Å, 52% of the pores had a radius of >10,000 Å. |

Polymerization of Ethylene (HDPE)

The polymerization of ethylene was carried out under the same conditions as for Example 1, using 0.0093 g of the solid catalyst component. After a polymerization time of three hours, 320 g of polymer were obtained, which showed the following characteristics:

| | |
|---|---|
| MIE | 0.413 g/10 min |
| MIF/MIE | 30.2 |
| Bulk Density, Poured | 0.33 g/cm$^3$ |
| Flowability | 17 s |
| Morphology | spherical |
| P.S.D. >4,000 μm | <1% (by weight) |
| 2,000–4,000 μm | 30–50% (by weight) |
| 1,000–2,000 μm | 20–40% (by weight) |
| 500–1,000 μm | 3–5% (by weight) |
| <500 μm | <2% (by weight) |

Example 5

A 1 liter reactor was charged with 50 g of the support of Example 1, after having been treated with AlEt$_3$, in suspension with 500 cm$^3$ of hexane. With stirring and at ambient temperature, 13 g of Ti(OBu)$_4$ diluted with 50 cm$^3$ of hexane were fed over 15 minutes. Stirring was continued for 1 hour, and then 20 g of SiCl$_4$ were fed over 15 minutes; thereafter the temperature was raised to 50° C. and kept constant for 2 hours. Washes with hexane were carried out to eliminate any free SiCl$_4$, followed at the end by vacuum drying at 50° C.

The resulting catalyst component in spherical form exhibited the following characteristics:

| | |
|---|---|
| Total Titanium | 2.7% (by weight) |
| Cl | 57.4% (by weight) |
| OEt | 5.6% (by weight) |
| OBu | 10.5% (by weight) |
| Porosity (B.E.T.) | 0.22 cm$^3$/g, 50% thereof being due to pores with a radius of >300 Å |
| Porosity (mercury) | 0.58 cm$^3$/g due to pores with a radius of 0-to-10,000 Å, 50% thereof being due to pores with a radius of >1,250 Å. Within the range of pores with a radius of 0-to-300,000 Å, 51.6% of the pores had a radius of >10,000 Å. |

Polymerization of Ethylene (HDPE)

The polymerization was carried out under the same conditions as for Example 1, using 0.013 g of the solid catalyst component. 215 g of polymer were obtained, which exhibited the following characteristics:

| | |
|---|---|
| MIE | 0.153 g/10 min |
| MIF/MIE | 30 |
| Bulk Density, Poured | 0.33 g/cm$^3$ |
| Flowability | 18 s |
| Morphology | spherical |
| P.S.D. >4,000 μm | <1% (by weight) |
| 2,000–4,000 μm | 20–30% (by weight) |
| 1,000–2,000 μm | 50–60% (by weight) |
| 500–1,000 μm | 2–4% (by weight) |
| <500 μm | <2% (by weight) |

Example 6

Continuous Polymerization of Ethylene in the Gas phase to Obtain HDPE 1.14 g/hr of the catalyst prepared as in Example 2 was prepolymerized with ethylene, in continuous, in a reactor at 30° C., 10.0 g/hr of TEAL being fed.

The resulting prepolymer was continuously fed to a fluidized bed gas-phase reactor, kept at 80° C. and 20 bars and having the following molar composition in the gas phase:

| | |
|---|---|
| Propane | 77.2% |
| Ethylene | 12.3% |
| Hydrogen | 7.7% |
| (the balance to 100% was formed by inert gases). | |

An average yield of 6.23 Kg/g of catalyst was obtained, and the resulting polymer had the following characteristics:

| | |
|---|---|
| MIE | 1.75 g/10 min |
| MIF/MIE | 28 |
| Real Density | 0.960 g/cm$^3$ |
| Bulk Density, Poured | 0.400 g/cm$^3$ |
| Bulk Density, Tamped | 0.438 g/cm$^3$ |
| Flowability | 9 s |
| Morphology | spherical |
| P.S.D. >4,000 μm | 0.0% (by weight) |
| 2,000–4,000 μm | 51.8% (by weight) |
| 1,000–2,000 μm | 43.9% (by weight) |
| 500–1,000 μm | 3.7% (by weight) |
| <500 μm | 0.6% (by weight) |

Example 7

Continuous Polymerization of Ethylene and Butene-1 to Obtain LLDPE 1.25 g/hr of the catalyst prepared as in Example 2 was prepolymerized with ethylene, in continuous, in a reactor at 30° C., 10.4 g/hr of TEAL being fed.

The resulting prepolymer was continuously fed to a fluidized bed gas-phase reactor, kept at 80° C. and 20 bars and having the following molar composition in the gas phase:

| | |
|---|---|
| Propane | 78.9% |
| Ethylene | 13.2% |
| Butene-1 | 4.6% |
| Hydrogen | 2.1% |
| (the balance to 100% was formed by inert gases). | |

An average yield of 10.4 Kg/g of catalyst was obtained, and the resulting polymer had the following characteristics:

| | |
|---|---|
| MIE | 1.01 g/10 min |
| MIF/MIE | 28.0 |
| Butene-1 Content | 7.0% by weight |
| Fraction Soluble in Xylene | 12.5% by weight |
| Real Density | 0.919 g/cm$^3$ |
| Bulk Density, Poured | 0.40 g/cm$^3$ |
| Bulk Density, Tamped | 0.423 g/cm$^3$ |
| Melting Point | 123.9 °C |
| Flowability | 12 s |
| P.S.D. >4,000 μm | 0.0% (by weight) |
| 2,000–4,000 μm | 55% (by weight) |
| 1,000–2,000 μm | 41.5% (by weight) |
| 500–1,000 μm | 3.0% (by weight) |
| <500 μm | 0.5% (by weight) |

Example 8

Step a)

In a 10 liter reactor equipped with a stirrer, 3,662 g of tetrabutoxytitanium were caused to react with 2,840 g of silicon tetrachloride. The reaction was conducted by adding the silicon tetrachloride to the tetrabutoxy-titanium contained in the reactor, over a time period of 60 minutes and at ambient temperature. The temperature was then raised to 30° C. and kept constant for an additional 60 minutes.

Step b)

A second 25 liter reactor, equipped with a stirrer, was charged with 2,000 g of the support of Example 1, after the treatment with AlEt$_3$, and 10 l of anhydrous hexane.

At ambient temperature and over 60 minutes, the product resulting from Step a) was introduced into the reactor of Step b), containing the hexanol slurry of the support kept under agitation. The temperature was then raised to 60° C. over a time period of 60 minutes and maintained constant for an additional 120 minutes.

The solid portion was allowed to settle and the liquid phase was removed, together with a small amount of a very fine TiCl$_3$ powder, by siphoning.

Thereafter the solid was washed seven consecutive times using 10 l of wash grade anhydrous hexane each time, at ambient temperature, and then vacuum dried at about 40° C.

The resulting dry powder showed a spherical form and a good flowability and exhibited the following characteristics:

| | |
|---|---|
| Total Titanium | 5.3% (by weight) |
| Ti$^{III}$ | 3.2% (by weight) |
| Mg | 15.9% (by weight) |
| Cl | 53.5% (by weight) |
| OEt | 2.6% (by weight) |
| OBu | 13% (by weight) |
| Porosity (B.E.T.) | 0.122 cm$^3$/g, 50% thereof being due to pores with a radius of >100 Å |
| Porosity (mercury) | Total Porosity = 0.79 cm$^3$/g; Porosity due to pores with a radius of from 0 to 10,000 Å = 0.453 cm$^3$/g, 50% thereof being due to pores with a radius of >1,000 Å. |

Polymerization of Ethylene (HDPE)

The polymerization was carried out using the same procedure as in Example 1, the only difference being that ethylene and hydrogen were fed at 40° C. until a polymerization yield of about 50-100 g of polymer per g of the catalyst (prepolymerization step) was reached, and thereafter the temperature was raised to 75° C. and maintained constant for 3 hours.

Using 0.0101 g of the solid catalyst component, 230 g of polymer were obtained. The characteristics of the polymer were as follows:

| | |
|---|---|
| MIE | 4.38 g/10 min |
| MIF/MIE | 34.93 |
| Real Density | 0.961 g/cm$^3$ |
| Bulk Density, Poured | 0.355 g/cm$^3$ |
| Flowability | 18 s |
| Morphology | spherical |

Copolymerization of Ethylene and Butene-1 (LLDPE)

The copolymerization was carried out according to the same procedure as in Example 1, using 0.118 g of the spherical component obtained as indicated above, the only difference being that a short pre-polymerization step at 40° C. to reach a yield of about 50–100 g of polymer per g of the catalyst was carried out prior to raising the temperature to 75° C.

385 g of polymer were obtained, which showed the following characteristics:

| | | |
|---|---|---|
| MIE | | 0.8 g/10 min |
| MIF/MIE | | 29 |
| Fraction Soluble in Xylene | | 12% (by weight) |
| Real Density | | 0.9212 g/cm$^3$ |
| Bulk Density, Poured | | 0.330 g/cm$^3$ |
| Flowability | | 18 s |
| Morphology | | spherical |
| P.S.D. | >4,000 μm | <2% (by weight) |
| | 2,000–4,000 μm | 49% (by weight) |
| | 1,000–2,000 μm | 45.5% (by weight) |
| | 500–1,000 μm | 2.8% (by weight) |
| | <500 μm | <0.7% (by weight) |

Example 9

Step a)

In a 50 cm$^3$ reactor, 12.5 g of the product of Ti(OBu)$_4$+ SiCl$_4$ were prepared under the same conditions as in Example 8, Step a).

Step b)

50 g of the support of Example 1, after having been treated with AlEt$_3$, were treated with dry air up to complete elimination of the residual C$_2$H$_5$ groups.

A 500 cm$^3$ reactor was charged with 150 cm$^3$ of anhydrous hexane and 50 g of the support obtained from Step b) above. Under stirring and at ambient temperature, 12.5 g of the product from Step a) above were fed to the reactor, over a time period of about 30 minutes. The temperature was raised to 60° C. and kept constant for 2 hours. The solid portion was allowed to settle and the liquid phase was removed by siphoning. Seven washes each with 200 cm$^3$ of wash grade anhydrous hexane were carried out, by settling and siphoning, followed by vacuum drying at 40° C.

60 g of a dry powder having a spherical shape and good flowability was obtained, showing the following characteristics:

| | |
|---|---|
| Total Titanium | 1.25% (by weight) |
| Ti$^{III}$ | 0.15% (by weight) |
| Mg | 15.95% (by weight) |
| Cl | 51.75% (by weight) |
| OEt | 9.8% (by weight) |
| OBu | 6.7% (by weight) |

Polymerization of Ethylene (HDPE)

The polymerization was carried out under the same conditions of Example 8, using 0.0098 g of the solid catalyst component. 215 g of polymer were obtained, which exhibited the following characteristics:

| | | |
|---|---|---|
| MIE | | 2.88 g/10 min |
| MIF/MIE | | 32.29 |
| Real Density | | 0.961 g/cm$^3$ |
| Bulk Density, Poured | | 0.34 g/cm$^3$ |
| Flowability | | 18 s |
| Morphology | | spherical |
| P.S.D. | >4,000 μm | <0.2% (by weight) |
| | 2,000–4,000 μm | 38.8% (by weight) |
| | 1,000–2,000 μm | 57.5% (by weight) |
| | 500–1,000 μm | 2.9% (by weight) |
| | <500 μm | <0.6% (by weight) |

We claim:

1. A process for the polymerization of ethylene and mixtures thereof with one or more olefins having the formula CH$_2$=CHR, wherein R is an alkyl, cycloalkyl or aryl group having 1–12 carbon atoms, said process comprising carrying out the polymerization in the presence of a catalyst, said catalyst comprising the product of reacting an aluminum alkyl compound with a spherical component, said spherical component comprising: a titanium compound having at least one Ti-halogen bond and one $OR^1$ group, wherein $R^1$ is an alkyl, cycloalkyl or aryl radical having 1–18 carbon atoms or a $COR^1$ group, said $OR^1$ group being bonded to Ti in such an amount as to yield a molar ratio of $OR^1$/Ti greater than 0.5, said titanium compound being supported on a magnesium dihalide in active form, said magnesium dihalide in active form being characterized by X-ray spectra wherein the most intense diffraction line appearing in the spectrum of the non-active halide shows a decreased intensity, and in said spectrum a halo appears, the maximum intensity of which is shifted towards lower angles with respect to the angles of the most intense line, said component having a porosity of from 0.35 to 0.7 $cm^3/g$, and a surface area comprised between 5 and 30 $m^2/g$, and wherein at least 50% of the porosity is due to pores having a radius greater than 800 Å.

2. The process of claim 1, wherein the polymerization is carried out in the presence of minor amounts of a diene.

3. The process of claim 1, wherein the olefin $C_2$=CHR is selected from the group consisting of butene-1, pentene-1, hexene-1, 4-methyl-pentene-1, and octene-1.

* * * * *

UNITED STATES PATENT AND TRADEMARK OFFICE
CERTIFICATE OF CORRECTION

PATENT NO. : 5,726,261
DATED : March 10, 1998
INVENTOR(S) : Mario Sacchetti, *et al.*

It is certified that error appears in the above-identified patent and that said Letters Patent is hereby corrected as shown below:

Column 16, line 9: Delete: "$C_2$=CHR" and Insert: --$CH_2$=CHR--

Signed and Sealed this

Ninth Day of June, 1998

Attest:

BRUCE LEHMAN

Attesting Officer     *Commissioner of Patents and Trademarks*